J. H. WESTCOTT.
Chucks for Metal Lathes.
No. 148,788.             Patented March 17, 1874.
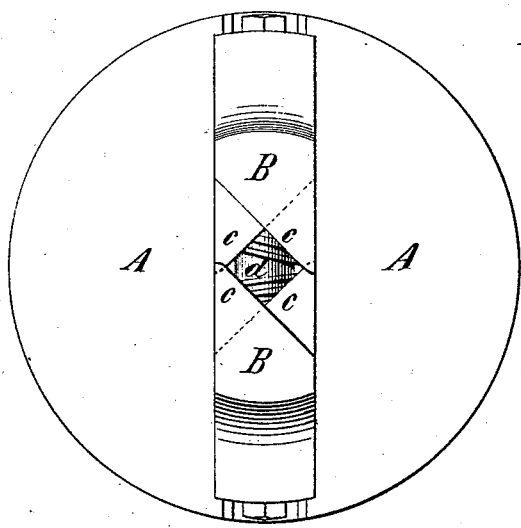
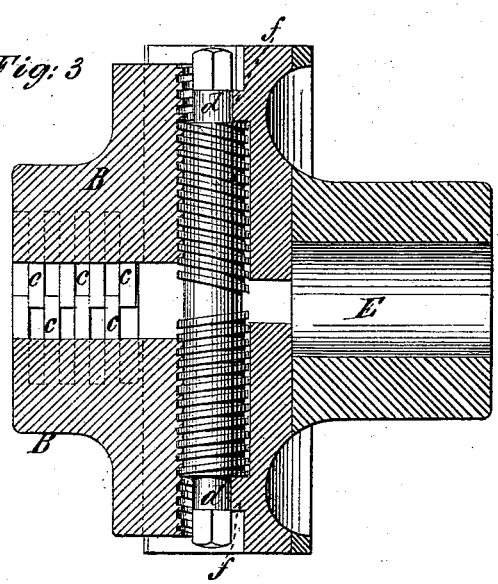
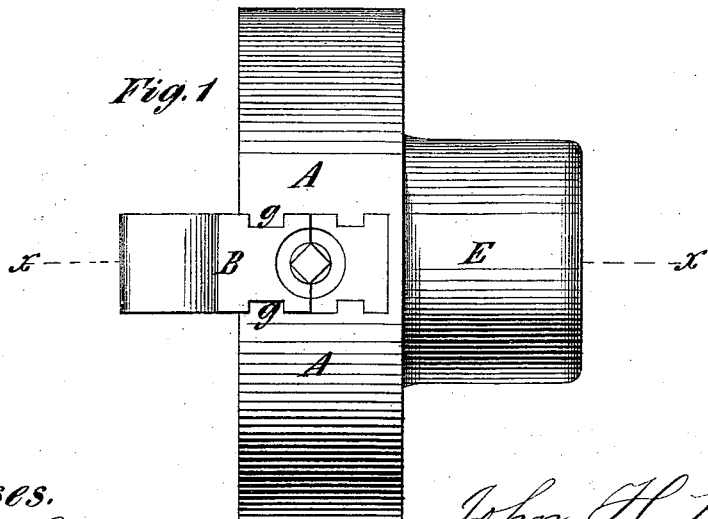
Witnesses.
Michael Ryan
Fred Haines
John H. Westcott
by his Attorneys
Brown & Allen

UNITED STATES PATENT OFFICE.

JOHN HENRY WESTCOTT, OF ONEIDA, NEW YORK.

IMPROVEMENT IN CHUCKS FOR METAL-LATHES.

Specification forming part of Letters Patent No. 148,788, dated March 17, 1874; application filed February 26, 1874.

*To all whom it may concern:*

Be it known that I, JOHN HENRY WESTCOTT, of Oneida, in the county of Madison and State of New York, have invented a new and useful Improvement in Chucks, of which the following is a a specification:

The object of my invention is to produce a chuck more easily, simply, quickly, and effectively adjustable than the chucks heretofore in use, for the griping and holding of various-sized drills, metallic rods, bars, wires, &c., for the purpose of operating the same in lathes or other machines. My invention consists in the combination, with a chuck-body or face-plate, of two movable and adjustable jaws, provided with triangular tongues, so arranged with reference to each other that when the jaws, sliding in a diametrical groove or recess in the face-plate, approach each other the tongues of each jaw penetrate between the tongues of the other jaw, and which jaws are operated and made to close in upon or release at will the object to be held by a right and left handed screw, working in corresponding right and left handed screw-threads in the jaws themselves.

In the accompanying drawing, Figure 1 is a side elevation of the chuck. Fig. 2 is a face view of the same. Fig. 3 is an axial section of the same, taken in the line $x\ x$ of Fig. 1.

A is the chuck-body or face-plate. B B are the jaws, fitted into and sliding in a diametrical groove or recess in the face-plate. $c\ c$, Figs. 1 and 2, are the triangular tongues. These triangular tongues are so arranged with reference to each other on each jaw that each tongue stands opposite a vacant space of the same form and size between the tongues upon the opposite side of the same jaw, and the two jaws are so constructed that when placed in the diametrical groove in the face-plate the tongues in one jaw are opposite the corresponding vacant spaces in the other jaw, as shown in Fig. 3, in which the tongues are represented as slightly interlocked. $d$ is a screw with a right-handed thread upon one portion thereof, and a left-handed thread upon the opposite portion, which right and left handed threads work in corresponding right and left handed threads, forming half of a female screw in each of the jaws B B, as shown in Fig. 3. The journal or shaft of the right and left handed screw $d$ rests upon a shoulder, $f$, and is squared at the end to fit it for the application of an appropriate wrench or key. $g\ g$, Fig. 1, are longitudinal ribs in the sides of the diametrical recess in the face-plate, fitting longitudinal grooves in the sides of the jaws, and which maintain the jaws while sliding in the diametrical recess, always in the same relation to the axis of the screw $d$. E is the hollow cylindrical neck of the chuck-body, by which it may be fixed in the usual manner to the spindle of a lathe.

When the parts of my improved chuck are placed in position, the screw $d$ is held from longitudinal motion by the shoulders $f\ f$. The jaws B B being guided by ribs $g$, the right and left screw-threads of these jaws must constantly engage the screw $d$, and consequently the jaws must approach and recede from each other according to the direction in which the screw is turned. As the jaws approach each other the tongues $c\ c$ of the one jaw must pass between the tongues of the opposite jaw, leaving a rectangular aperture not covered by the tongues, as shown at $d$, Fig. 2, which will be larger or smaller as the jaws approach or recede from each other. This rectangular aperture may be made the socket in which any object, down to the smallest wire or drill, may be placed and firmly held by simply turning the screw $d$ in the right direction till the edges of the tongues close in upon and gripe the object to be held, and the object may be at once released by a turn or two of the screw in the opposite direction.

What I claim as new, and desire to secure by Letters Patent, is—

The combination, in a chuck, of the movable jaws B, provided with the triangular tongues $c\ c$, and having right and left hand female screw-threads in their backs, and the right and left hand screw $d$ for the purpose of operating and adjusting said jaws, all substantially as described.

JOHN HENRY WESTCOTT.

Witnesses:
T. F. HAND, Jr.,
J. E. OSTRANDER.